United States Patent
Liao

[19]

[11] Patent Number: 5,927,442
[45] Date of Patent: Jul. 27, 1999

[54] DEVICE FOR CONTROLLING THE OPERATIONAL SEQUENCE OF BRAKE ASSEMBLIES FOR BICYCLES

[76] Inventor: Chi-Chao Liao, No. 5, Lane 2, Tungyang Road, Fengyuan City, Taichung Hsien, Taiwan

[21] Appl. No.: 08/867,171

[22] Filed: Jun. 2, 1997

[51] Int. Cl.$^6$ ..................................................... B62L 1/06
[52] U.S. Cl. ................... 188/24.16; 188/2 D; 74/480 R; 74/500 S
[58] Field of Search .............................. 74/480 R, 500.5, 74/480 B, 502.4, 502.6; 188/24.16, 24.21, 24.22, 24.11, 2 D, 24.15

[56] References Cited

U.S. PATENT DOCUMENTS 4,057,127  11/1977  Woodring .............................. 188/24.16

FOREIGN PATENT DOCUMENTS 2123501  2/1984  United Kingdom ................ 188/24.16

*Primary Examiner*—Robert J. Oberleitner
*Assistant Examiner*—Hargobind S. Sawhney
*Attorney, Agent, or Firm*—Merchant, Gould, Smith, Edell, Welter & Schmidt, P.A.

[57] ABSTRACT

A device for controlling the operational sequence of brake assemblies for bicycles includes a box within which a frame is slidably received, a first member and a second member juxtaposedly and slidably received in the frame, two cables extending from two brake levers respectively connecting to the two members respectively, each of the two members having a recess for receiving a barrel end of a front brake cable extending from a front brake assembly when the two recesses are not in alignment with each other by grasping eitherone of the brake levers, a drop recess defined below the corresponding recess in each of the members so that a barrel end of a rear brake cable is received in a space formed by the two drop recesses when the two brake levers are grasped or released simultaneously. Accordingly, whichever brake lever is grasped, the rear brake assembly is engaged first.

4 Claims, 5 Drawing Sheets

DEVICE FOR CONTROLLING THE OPERATIONAL SEQUENCE OF BRAKE ASSEMBLIES FOR BICYCLES

BACKGROUND OF THE INVENTION

1. Field of the Invention

The present invention relates to a device and, more particularly, to a device which ensures that the rear brake assembly of a bicycle is engaged regardless of first which brake lever is grasped.

2. Brief Description of the Prior Art

Generally, a bicycle is equipped with a front brake assembly and a rear brake assembly disposed to the bicycle's frame each of which includes two brake pads located on two sides of a respective rim. Two brake levers are attached to a handlebar of the bicycle and are respectively connected to the front brake assembly and the rear brake assembly so that when a user grasps any one of the two break levers, the brake assembly corresponding thereto is engaged. In order to theoretically maintain a better balance condition when braking the bicycle, the rear brake assembly should be engaged first because the rear wheel is the driving wheel of the bicycle. However, the user, in a state of panic or confusion, could first acfuate the front brake assembly resulting in a possible accident.

The present invention intends to provide a device for controlling the operational sequence of brake assemblies to ensure that the rear brake assembly is engaged first to mitigate and/or obviate the above-mentioned problems.

SUMMARY OF THE INVENTION

The present invention provides a device for sequencing brake assemblies of bicycles and comprises a box having a frame slidably received therein and a first member and a second member each slidably received in the frame. Two cables respectively extending from two brake levers each extend through two first holes defined in a first end wall of the box and two third holes defined in a first end portion of the frame to connect to the first member and the second member.

The first member has a width half of that of the frame and has a first recess defined in an inner side thereof and the first recess is accessible from a front surface of the first member. A first drop recess is defined in the inner side of the first member below the first recess and communicates with the first recess. The first member has a first groove defined longitudinally in the inner side thereof. The second member has a width half of that of the frame and has a second recess defined in an inner side thereof and the second recess is accessible from a front surface of the second member. A second drop recess is defined in the inner side of the second member below the second recess and communicates with the second recess. The second member has a second groove defined longitudinally in the inner side thereof.

A first cable has of one end thereof a barrel end disposed on an upper surface of a second end portion and the other end thereof extending through the second end portion and the box to be connected to a rear brake assembly. A second cable has at one end thereof a barrel end received in a space defined by two peripheries respectively defining the first and the second drop recesses, and the other end of the second cable extends through the second end portion and the box to be connected to a front brake assembly.

It is an object of the present invention to provide a device which ensures that a rear brake assembly is engaged first no matter which brake lever is grasped.

It is another object of the present invention to provide a device which ensures a front brake assembly is disengaged first no matter which brake lever is released first.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
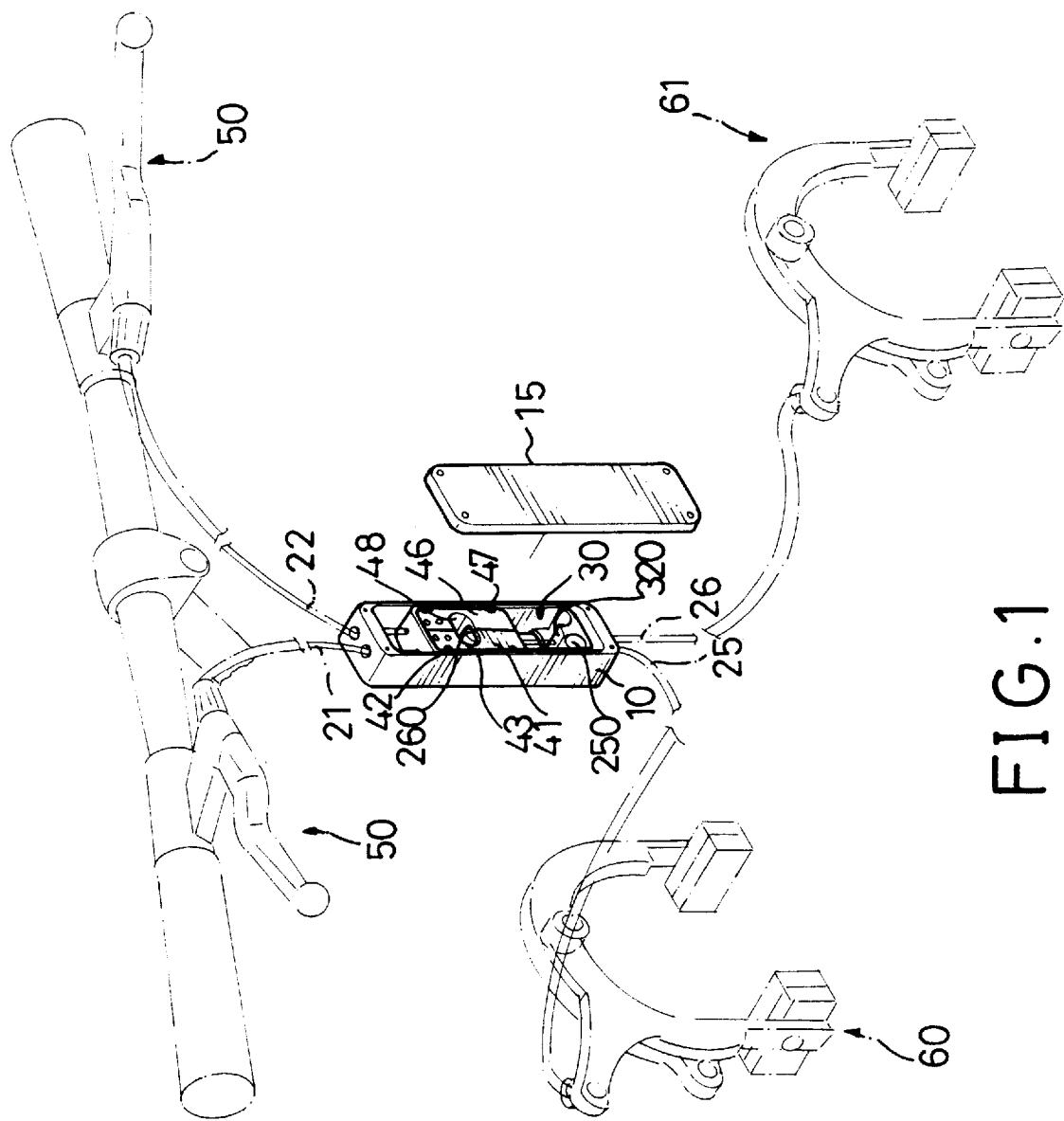
FIG. 1 is an exploded view of a device and a cover for controlling the operational sequence of brake assemblies for bicycles in accordance with the present invention.
Figure 2:
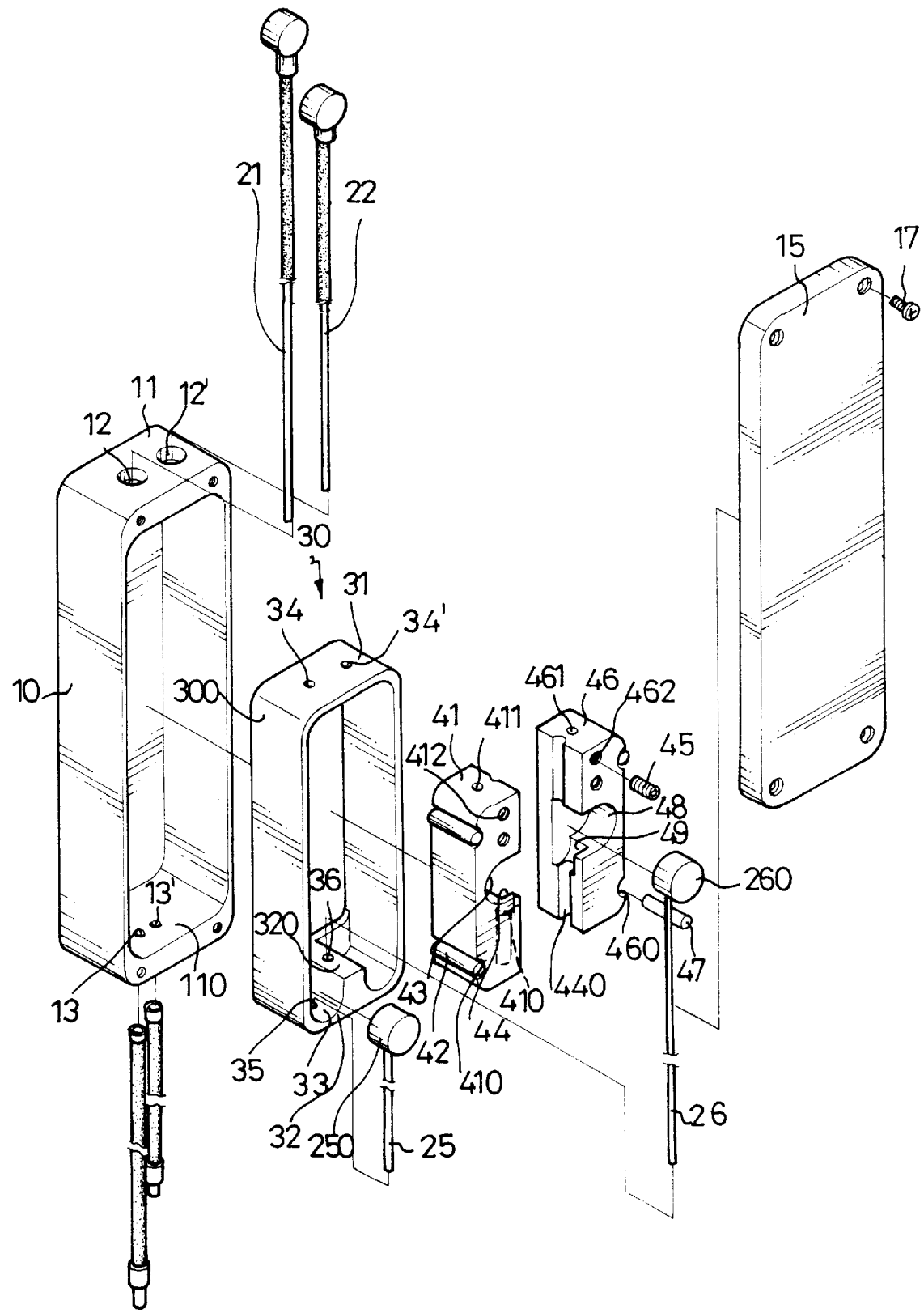
FIG. 2 is an exploded view of the device in accordance with the present invention.
Figure 3:
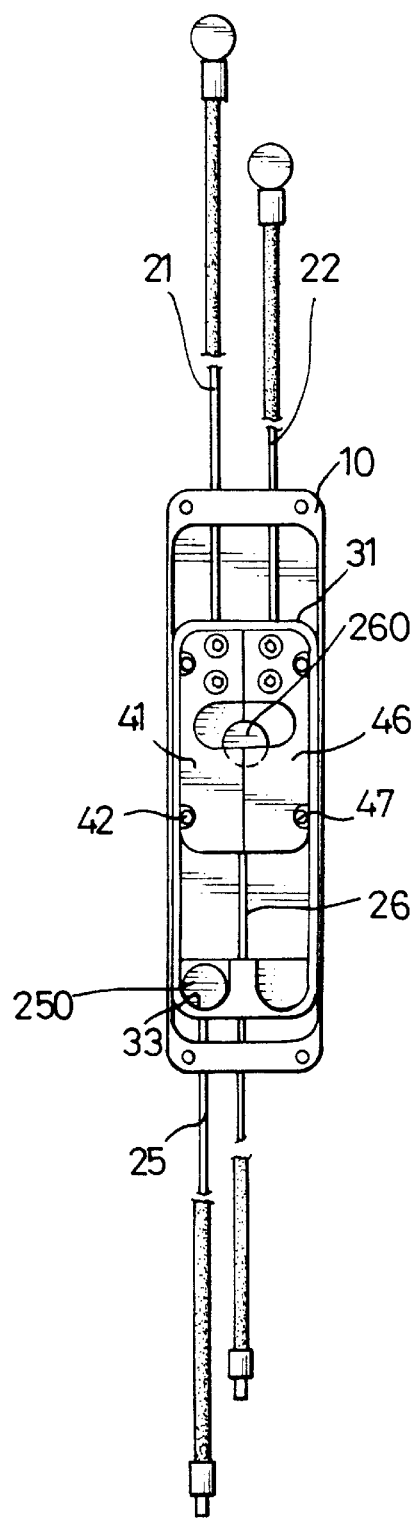
FIG. 3 is a front elevational view of the device in accordance with the present invention.

Referring to the drawings and initially to FIGS. 1 through 3, a device for controlling the operational sequence of brake assemblies for bicycles comprises a box 10 which is a rectangular box having a cover 15 and two first holes 12, 12' defined through a first end wall 11 thereof and two second holes 13, 13' defined through a second end wall 110 thereof. The cover 15 is fixedly connected to the box 10 by bolts 17.

A frame 30 is slidably received in the box 10 which has a first end portion 31, a second end portion 32 and two side portions 300. Two third holes 34, 34' are defined through the first end portion 31 and located in alignment with the first holes 12, 12'. The second end portion 32 of the frame 30 has a ridge 320 extending centrally from an upper surface thereof to separately define two semi-circular recesses 33. A fourth hole 35 is defined through the second end portion 32 and located in one of the two semi-circular recesses 33 and a fifth hole 36 is defined centrally through the ridge 320. The fourth hole 35 is in alignment with the second hole 13 and the fifth hole 36 is in alignment with the second hole 13'.

A first member 41 is slidably received in the frame 30 and has a width half of that of the frame 30. The first member 41 has a first recess 43 defined in an inner side thereof and the first recess 43 is accessible from a front surface of the first member 41. A first drop recess 44 is defined in the inner side of the first member 41 below the first recess 43 and communicates with the first recess 43. The first member 41 further has a first groove 410 defined longitudinally in the inner side thereof. The first member 41 has a hole 411 defined in a top thereof and two screw holes 412 defined in a front surface thereof and the hole 411 communicates with the two screw holes 412.

A second member 46 is slidably received in the frame 30 and has a width half of that of the frame 30. The second member 46 has the same structure as that of the first member 41, that is to say, the second member 46 has a second recess 48 defined in an inner side thereof and the second recess 48 is accessible from a front surface of the second member 46, a second drop recess 49 defined in the inner side of the second member 46 below the second recess 48 and communicates with the second recess 48, and the second member 46 having a second groove 440 defined longitudinally in the inner side thereof. The second member 46 has a hole 461 defined in a top thereof and two screw holes 462 defined in a front surface thereof and the hole 461 communicates with the two screw holes 462.

Each first member 41 and the second member 46 has at least one transverse groove 410/460 defined in an outer side thereof and the transverse groove 410/460 receives a roller 42/47 therein so that the first member 41 and the second member 46 are able to be slidably and juxtaposedly received in the frame 30 with each respective inner side contacting each other.

Two cables 21, 22 each have a first end extending through the first holes 12, 12' and the third holes 34, 34' and are inserted into the respective holes 411, 461 so as to be fixedly and respectively connected to the first member 41 and the second member 46 by threading bolts 45 into the respective screw holes 412, 462 to position the cables 21, 22. The two cables 21, 22 each have a second end connected to respective brake levers 50.

A first cable 25 has at one end thereof a barrel end 250 disposed in one of the recesses 33 defined in the upper surface of the second end portion 32 and the other end thereof extends through the fourth hole 35 and the second hole 13 so as to be connected to a rear brake assembly 60. A second cable 26 has at one end thereof a barrel end 260 received in a space between defined by two peripheries each defining the first and the second drop recesses 44, 49, and is received in the first groove 410 and the second groove 440. The other end of the second cable 26 extends through the fifth hole 36 and the second hole 13' so as to be connected to a front brake assembly 61.

Each first recess 43 and second recess 48 is sized to receive the whole barrel end 260 of the second cable 26 when either the first member 41 or the second member 46 is moved.

Figure 4:
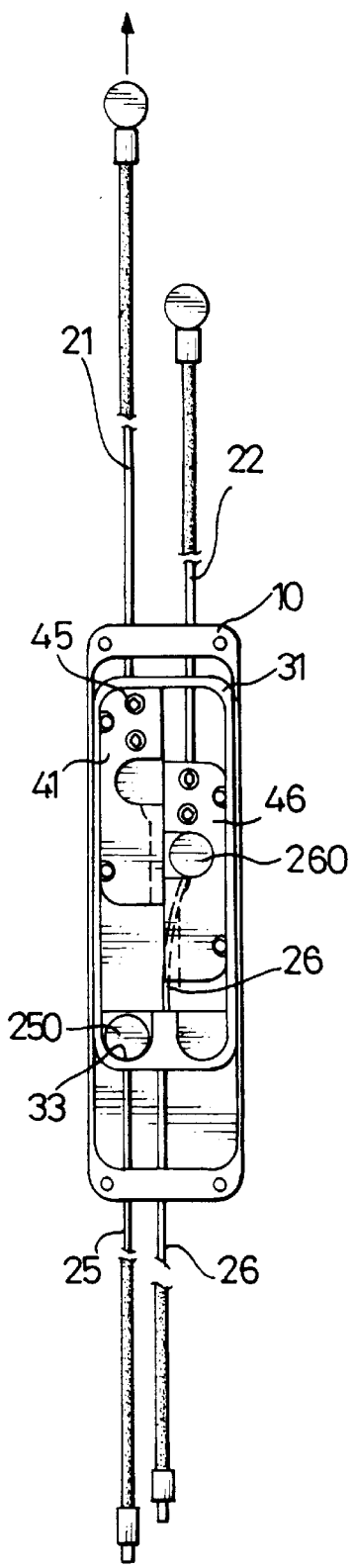
FIG. 4 is a front elevational view of the device to show a movement thereof when one of the two brake levers is grasped.
Figure 5:
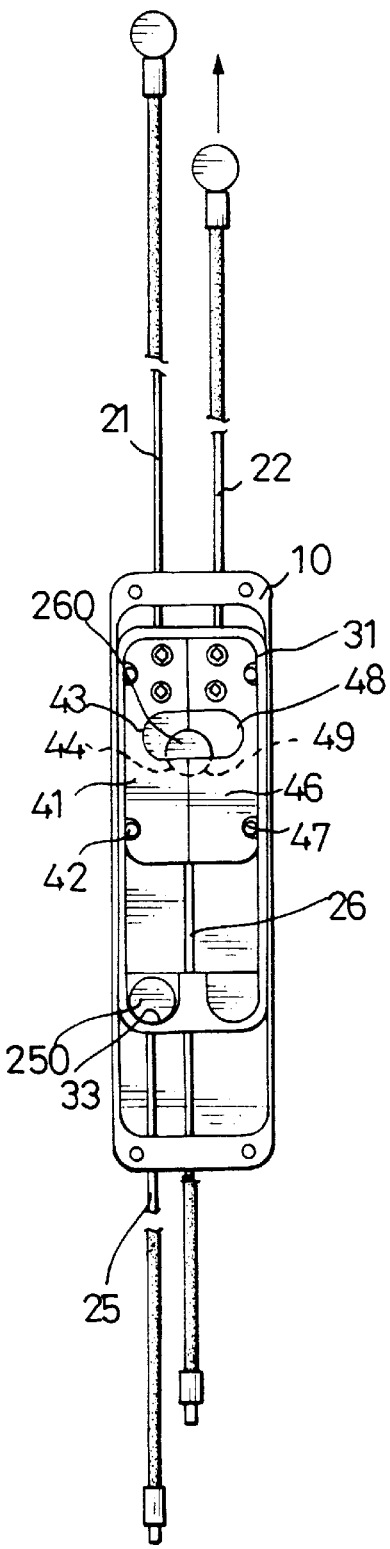
FIG. 5 is a front elevational view of the device to show a movement thereof when the other brake lever is grasped.

Referring to FIG. 4 and 5, when either one of the two cables 21, 22 is grasped, for example, if the cable 21 is grasped first and the cable 22 is grasped later, the first member 41 is pulled upwardly within the frame 30 and contacts the first end portion 31 to carry the frame 30 together with the first cable 25 connected to the rear brake assembly 60 upwardly so that the rear brake assembly 60 is engaged. Meanwhile, the barrel end 260 of the second cable 26 is pushed by the periphery defining the first drop recess 44 when the first member 41 is moved upwardly to be received in the second recess 48 in the second member 46 as shown in FIG. 4. When the cable 22 is grasped, the second member 46 is moved upwardly and the second recess 48 will be raised to a position where both the first recess 43 and the second recess 48 and both the first drop recess 44 and the second drop recess 49 are in alignment with each other again, and the barrel end 260 will be received in its original space as shown in FIG. 5. When the second member 46 is pulled upwardly, the second cable 26 is lifted to operate the front brake assembly 61.

Figure 6:
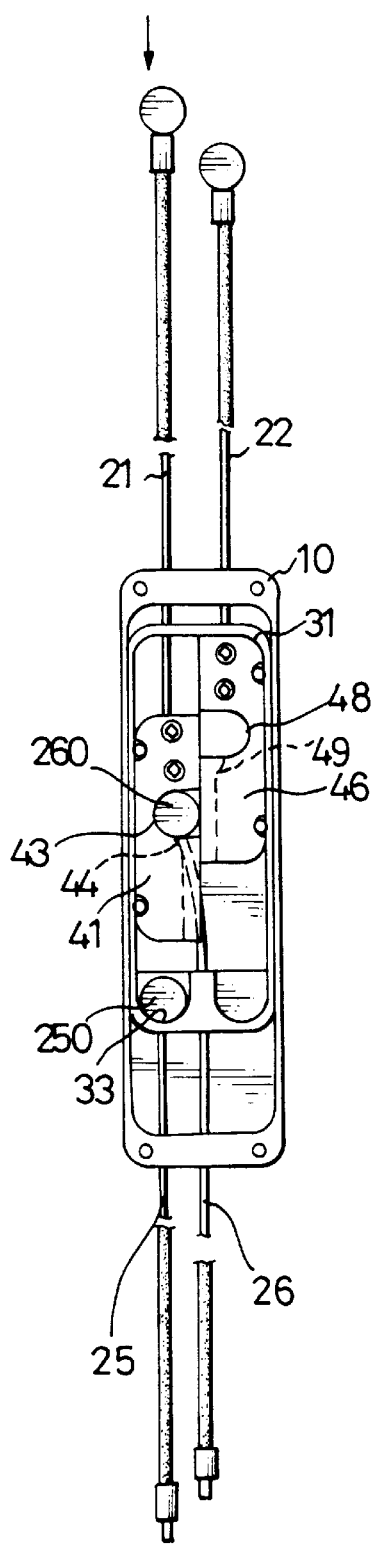
FIG. 6 is a front elevational view of the device to show a movement thereof when the cable mentioned in FIG. 4 is released.
Figure 7:
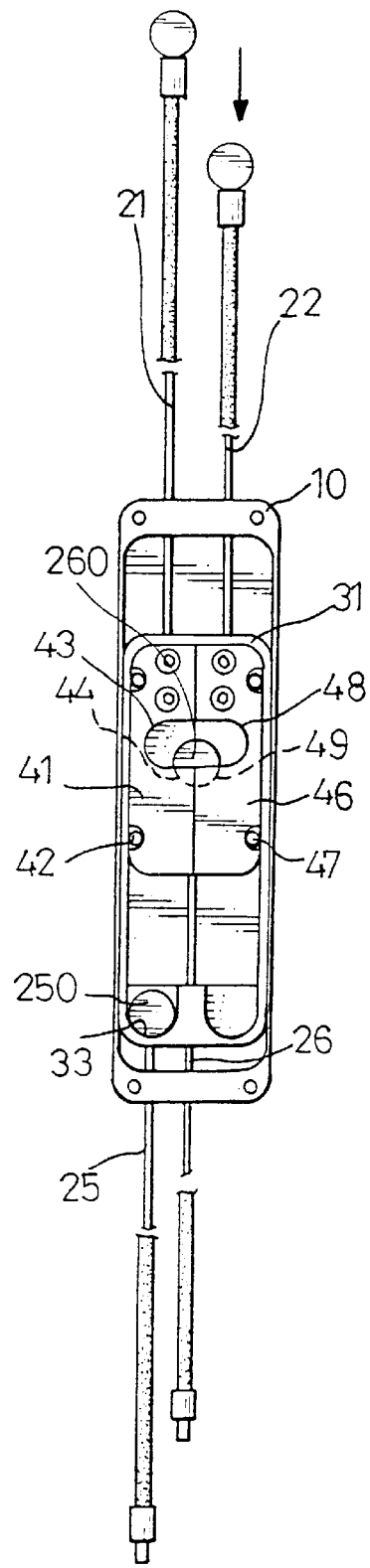
FIG. 7 is a front elevational view of the device to show a movement thereof when the cable mentioned in FIG. 5 is released.

Referring to FIGS. 6 and 7, when either one of the cables 21, 22 is released, for example, if the cable 21 is first released and the cable 22 is released later, similarly, the barrel end 260 of the second cable 26 is pushed to be received in the first recess 43 when the first member 41 is lowered within the frame 30 disengaging the front brake assembly 61. At this moment, the frame 30 and the first cable 25 are still maintain, their position and the rear brake assembly 60 remains engaged. The first member 41 is then lowered to contact the barrel end 250 of the first cable 25 and the frame 30 is lowered. The first cable 25 is then lowered with the frame 30 to disengage the rear brake assembly 60.

Accordingly, the device ensures that the rear brake assembly 60 of a bicycle will be engaged first regardless of which brake lever 50 is grasped and the front brake assembly is disengaged first no matter whichbrake lever 50 is released first.

Although the invention has been explained in relation to its preferred embodiment, it is to be understood that many other possible modifications and variations can be made without departing from the spirit and scope of the invention as hereinafter claimed.

What is claimed is:

1. A device for controlling the operational sequence of brake assemblies for bicycles and comprising:

a box defining two first holes through a first end wall thereof and two second holes through a second end wall thereof;

a frame slidably received in said box having two side portions and at least a first end portion and a second end portion, two third holes defined through said first end portion and located in alignment with said first holes, a fourth hole defined through said second end portion and a fifth hole defined centrally through said second end portion, said fourth hole being in alignment with one of said second holes and said fifth hole being in alignment with the other second hole;

a first member slidably received in said frame and having a width half of that of said frame, said first member having a first recess defined in an inner side thereof and said first recess being accessible from a front surface of said first member, a first drop recess defined in said inner side of said first member below said first recess and communicating with said first recess, said first member having a first groove defined longitudinally in said inner side thereof;

a second member slidably received in said frame and having a width half of that of said frame, said second member having a second recess defined in an inner side thereof and said second recess being accessible from a front surface of said second member, a second drop recess defined in said inner side of said second member below said second recess and communicating with said second recess, said second member having a second groove defined longitudinally in said inner side thereof;

two cables each having a first end extending through said first holes and said third holes and being respectively fixedly connected to said first member and said second member, said two cables each having a second end thereof connected to respective brake levers;

a first cable having at one end thereof a barrel end disposed on an upper surface of said second end portion and the other end thereof extending through said fourth hole and said second hole so as to be connected to a rear brake assembly, and a second cable having at one end thereof a barrel end received in a space between two peripheries each defining said first and said second drop recesses, the other end of said second cable extending through said fifth hole and said second hole so as to be connected to a front brake assembly.

2. The device as claimed in claim 1 wherein each of said first recess and said second recess is respectively sized to receive said barrel end of said second cable.

3. The device as claimed in claim 1 wherein each of said first member and said second member has at least one transverse groove defined in an outer side thereof and said transverse groove receives a roller therein.

4. The device as claimed in claim 1 wherein said second end portion of said frame has a ridge extending from said upper surface thereof to separately define two semi-circular recesses so that said barrel end of said first cable is received in one of said semi-circular recesses and said fifth hole is defined through said ridge.

* * * * *